United States Patent
Ishibashi et al.

(10) Patent No.: US 11,255,468 B2
(45) Date of Patent: Feb. 22, 2022

(54) GASKET FOR FLUID COUPLING, AND FLUID COUPLING

(71) Applicants: FUJIKIN INCORPORATED, Osaka (JP); TOKYO ELECTRON LIMITED, Minato-ku (JP)

(72) Inventors: Keisuke Ishibashi, Osaka (JP); Tadayuki Yakushijin, Osaka (JP); Tsuyoshi Tanikawa, Osaka (JP); Michio Yamaji, Osaka (JP); Tsuneyuki Okabe, Minato-ku (JP)

(73) Assignees: FUJIKIN INCORPORATED, Osaka (JP); TOKYO ELECTRON LIMITED, Minato-ku (JP)

( * ) Notice: Subject to any disclaimer, the term of this patent is extended or adjusted under 35 U.S.C. 154(b) by 123 days.

(21) Appl. No.: 15/566,367

(22) PCT Filed: Mar. 25, 2016

(86) PCT No.: PCT/JP2016/059651
§ 371 (c)(1),
(2) Date: Oct. 13, 2017

(87) PCT Pub. No.: WO2016/167100
PCT Pub. Date: Oct. 20, 2016

(65) Prior Publication Data
US 2018/0299042 A1    Oct. 18, 2018

(30) Foreign Application Priority Data
Apr. 15, 2015  (JP) .............................. JP2015-082996

(51) Int. Cl.
*F16L 19/02* (2006.01)
*F16L 15/04* (2006.01)
(Continued)

(52) U.S. Cl.
CPC ............... *F16L 15/04* (2013.01); *F16J 15/06* (2013.01); *F16J 15/0818* (2013.01); *F16J 15/10* (2013.01);
(Continued)

(58) Field of Classification Search
CPC ...... F16L 19/0218; F16J 15/104; F16J 15/121
(Continued)

(56) References Cited

U.S. PATENT DOCUMENTS

| 535,236 | A | * | 3/1895 | Anderson | ............... | F16L 19/04 |
| | | | | | | 285/332.3 |
| 1,426,724 | A | * | 8/1922 | Fyffe | ................... | F16L 19/0218 |
| | | | | | | 285/332.1 |

(Continued)

FOREIGN PATENT DOCUMENTS

| GB | 1194436 | 6/1970 |
| JP | 63-60788 U | 4/1988 |

(Continued)

OTHER PUBLICATIONS

International Search Report dated Jun. 21, 2016, in PCT/JP2016/059651, filed Mar. 26, 2016.

(Continued)

*Primary Examiner* — David Bochna
(74) *Attorney, Agent, or Firm* — Oblon, McClelland, Maier & Neustadt, L.L.P.

(57) ABSTRACT

A gasket includes a thick portion providing a first face seal and a thin portion providing a second face seal. A fluid coupling has an annular gasket housing recess that includes a wide portion for housing the thick portion of the gasket and a narrow portion for housing the thin portion of the gasket.

11 Claims, 4 Drawing Sheets

(51) Int. Cl.
  *F16J 15/10* (2006.01)
  *F16J 15/06* (2006.01)
  *F16L 41/14* (2006.01)
  *F16L 23/18* (2006.01)
  *F16L 23/028* (2006.01)
  *F16J 15/08* (2006.01)

(52) U.S. Cl.
  CPC ....... *F16L 19/0218* (2013.01); *F16L 23/0283* (2013.01); *F16L 23/18* (2013.01); *F16L 41/14* (2013.01)

(58) Field of Classification Search
  USPC .......................................... 285/353, 354, 336
  See application file for complete search history.

(56) References Cited

U.S. PATENT DOCUMENTS

| | | | | |
|---|---|---|---|---|
| 2,070,291 | A * | 2/1937 | McHugh | F16L 19/0218 138/140 |
| 2,287,142 | A * | 6/1942 | Simmonds | F16L 19/046 285/334.3 |
| 2,699,344 | A * | 1/1955 | Bissell | F16L 23/18 285/148.7 |
| 2,761,707 | A * | 9/1956 | Herman | F16L 23/10 220/320 |
| 3,189,371 | A * | 6/1965 | Swan | F16L 23/125 138/141 |
| 3,521,892 | A * | 7/1970 | Gulick | F16L 23/18 277/611 |
| 3,679,237 | A * | 7/1972 | De Angelis | F16L 19/025 285/109 |
| 4,304,415 | A * | 12/1981 | Wolf | F16L 21/035 277/615 |
| 4,779,903 | A * | 10/1988 | Maier | F16L 23/0286 277/626 |
| 4,836,583 | A * | 6/1989 | Maier | F16L 23/0286 285/336 |
| 6,234,545 | B1 * | 5/2001 | Babuder | F16L 23/10 277/608 |
| 7,350,833 | B2 * | 4/2008 | Bongiorno | F16L 23/02 277/608 |
| 7,484,770 | B2 * | 2/2009 | Hamada | F16L 41/03 285/124.4 |
| 7,686,351 | B2 * | 3/2010 | Molina, III | F16L 19/0218 285/353 |
| 2008/0111321 | A1 * | 5/2008 | Okumura | F16J 15/104 277/651 |
| 2009/0126808 | A1 | 5/2009 | Katsura | |
| 2014/0333067 | A1 | 11/2014 | Okabe et al. | |
| 2014/0375051 | A1 | 12/2014 | Ikushima | |

FOREIGN PATENT DOCUMENTS

| | | |
|---|---|---|
| JP | 2-127882 U | 10/1990 |
| JP | 6-46054 U | 6/1994 |
| JP | 7-158783 A | 6/1995 |
| JP | 10-318460 A | 12/1998 |
| JP | 2006-313006 A | 11/2006 |
| JP | 2013-68270 A | 4/2013 |
| JP | 2013-124681 A | 6/2013 |
| WO | 98/37352 A1 | 8/1998 |
| WO | 2013/042573 A1 | 3/2013 |
| WO | 2013/153672 A1 | 10/2013 |

OTHER PUBLICATIONS

Japanese Office Action dated Oct. 29, 2019 in Japanese Patent Application No. 2015-082996 (with unedited computer generated English translation), 10 pages.
Combined Chinese Office Action and Search Report dated Aug. 26, 2020 in Chinese Patent Application No. 201680029266.6 (with English translation and English translation of Category of Cited Documents), 15 pages.
Ryumin, C., "Spacecraft Structure and Mechanism", China Science and Technology Publishing Co., Ltd., Jan. 2005, pp. 265-267 with cover pages (with English translation of the Examiner's statement in the office action concerning the inventive step).

* cited by examiner

GASKET FOR FLUID COUPLING, AND FLUID COUPLING

TECHNICAL FIELD

The present invention relates to a gasket for a fluid coupling, and the fluid coupling. The present invention particularly relates to a gasket for providing a face seal in a fluid coupling such as a pipe joint, and various fluid couplings using such a gasket.

BACKGROUND ART

As a fluid coupling, Patent Literature 1 discloses a pipe joint including: first and second tubular joint members; a gasket interposed between butt portions of the joint members; and screw means for connecting the joint members, in which each of the joint members is provided on a butt end face thereof with an annular recess for forming a gasket housing portion for housing the gasket when the joint members are butted against each other, and in a state where a pipe joint is appropriately fastened, a substantially entire surface of an recessed inner surface of the first joint member is in intimate contact with the gasket, a surface of the gasket exposed from the recess is in intimate contact with a substantially entire surface of a recessed inner surface of the second joint member, a radially inside portion with respect to the recess of the butt end face of the first joint member and a radially inside portion with respect to the recess of the butt end face of the second joint member are in intimate contact with each other over the substantially entire surface, and a radially outside portion with respect to the recess of the butt end face of the first joint member and a radially outside portion with respect to the recess of the butt end face of the second joint member are in intimate contact with each other over the substantially entire surface.

The gasket disclosed in Patent Literature 1 has an annular shape and is rectangular in cross section. The gasket housing recess formed by the first and second tubular joint members is also rectangular in cross section.

CITATION LIST

Patent Literature

Patent Literature 1: Japanese Patent No. 3538737

SUMMARY OF INVENTION

Technical Problem

In the gasket for the fluid coupling and the fluid coupling, as indicated in Patent Literature 1, all the materials are synthetic resin, in some cases. In such a case, as compared to the case where the material is metal, maintenance of the sealing performance for a long period of time is particularly an important problem. In addition, in the gasket for the fluid coupling and the fluid coupling, which are made of metal, further improvement of the sealing performance is required.

An object of the present invention is to provide a gasket for a fluid coupling and the fluid coupling, in which the sealing performance is improved.

Solution to Problem

The gasket for the fluid coupling in accordance with the present invention is a gasket configured to provide a face seal by being fitted into an annular recess provided in the fluid coupling, wherein the gasket includes: a thick portion providing a first face seal; and a thin portion providing a second face seal.

For example, the thick portion is provided in a radially outside portion, and the thin portion is provided in a radially inside portion. The thick portion may be provided in the radially inside portion, and the thin portion may be provided in the radially outside portion.

A conventional gasket that provides a face seal is generally rectangular in cross section. In some cases, the conventional gasket is nonrectangular, but even in such a case, it is not so designed that both of the thick portion and the thin portion provide face seals.

In accordance with the present invention, both of the thick portion and the thin portion provide face seals, whereby the sealing performance is improved.

The gasket is pressed against toward the outer side when pressurization of the fluid is performed, and is pressed against toward the inner side when depressurization of the fluid is performed. Therefore, the conventional gasket (O-ring) has been designed, using the outer diameter of the gasket as a reference when the pressurization of the fluid is performed, and using the inner diameter of the gasket as a reference when the depressurization of the fluid is performed. As such, the gasket has been basically used for either one of the cases, in the conventional art. In contrast, with the present invention, by performing the setting with use of the radially outside portion in the case where the pressurization of the fluid is performed and with use of the radially inside portion in the case where the depressurization of the fluid is performed, the gasket may be used in either case of the pressurization of the fluid or the depressurization of the fluid.

Furthermore, with the present invention, a squeeze of the first face seal and a squeeze of the second face seal may be set at different values from each other, and therefore, the target value for the sealing performance may be optimally set according to the application purpose.

The gasket may be made of metal such as stainless steel (for example, SUS316L), or may be made of fluorine-based synthetic resin such as perfluoroelastomer (for example, Kalrez (registered trademark)).

It is preferable that at least one anti-drop protrusion is provided on an outer peripheral surface of the gasket. This configuration prevents the gasket from dropping from the annular recess (gasket housing recess) at a time when the gasket is fitted to the fluid coupling.

One of the thick portion and the thin portion is made of metal, and the other of the thick portion and the thin portion is made of synthetic resin, in some cases. With this configuration, a seal structure made of metal and a seal structure made of synthetic resin are both provided, whereby extremely high sealing performance may be obtained. The first and second members in this case are preferably made of metal.

The fluid coupling in accordance with the present invention is a fluid coupling including: a first member having a first fluid passage; a second member having a second fluid passage and connected to the first member in a fluid-tight manner; a gasket interposed between butt portions of the first and second members; and screw means for connecting the first and second members, in which each of the first and second members is provided on a butt end face thereof with an annular gasket housing recess for housing the gasket when the first and second members are butted against each other, wherein the gasket housing recess includes a wide portion for housing the thick portion of the gasket and a narrow portion for housing the thin portion of the gasket, and the gasket is the gasket for the fluid coupling described in one of the above.

The thick portion of the gasket is fitted into the wide portion of the gasket housing recess with a first squeeze. The thin portion of the gasket is fitted into the narrow portion of the gasket housing recess with a second squeeze.

Although the value of the first squeeze and the value of the second squeeze may be equal to each other, the values may be preferably different from each other. In the case where the value of the first squeeze is different from the value of the second squeeze, reducing the squeeze (compressibility) on the inner side is preferable in order to suppress development of cracks on the radially inside portion under a high temperature condition.

Conforming to the gasket made of metal, the first and second members may be made of metal, such as stainless steel. Alternatively, conforming to the gasket made of synthetic resin, the first and second members may be made of synthetic resin, such as tetrafluoroethylene-perfluoroalkyl-vinyl ether copolymer (PFA).

In the case of the fluid coupling made of stainless steel, sufficient durability cannot be secured in some cases to withstand a substance, such as ammonium hydrogen fluoride, which is used in the semiconductor manufacturing process and is highly corrosive to metal. To address this issue, the fluid coupling made of stainless steel is replaced by that made of synthetic resin, whereby the durability is improved. In the case of the fluid coupling made of synthetic resin, change in shape over time (stress relaxation, cold flow, and the like) is greater than the fluid coupling made of metal, and surface pressure between the members at the butt portion gradually decreases, whereby there arises a risk of fluid leakage. To address this issue, the face seals are provided by both of the thick portion and the thin portion, whereby even the fluid coupling made of synthetic resin secures sufficient sealing performance.

In the fluid coupling described above, both of the first member and the second member may be tubular joint members; and the first member may be a tubular joint member provided with a flange portion having a bolt insertion hole, and the second member may be a member provided with a connection portion having a female screw portion.

The fluid to flow in the fluid coupling may be a gas or may be a liquid. The second member may be, for example, a gas chamber made of aluminum, may be a fluid controller such as a valve, or may be a passage block used in an integrated fluid control apparatus.

Advantageous Effects of Invention

With the gasket for the fluid coupling and the fluid coupling in accordance with the present invention, providing a face seal by both of the thick portion and the thin portion improves the sealing performance and allows use thereof both in the pressurization of the fluid and the depressurization of the fluid.

Figure 1:
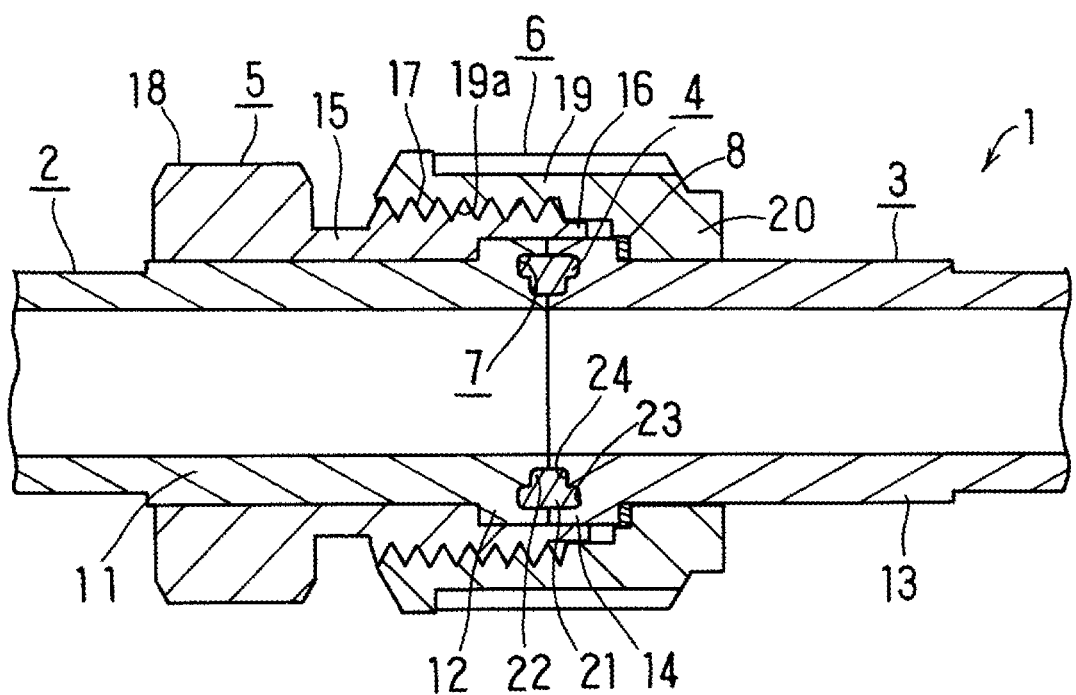
FIG. 1 is a vertical cross-sectional view of a gasket for a fluid coupling and the fluid coupling as an entire configuration of a first embodiment in accordance with the present invention.

REFERENCE SIGNS LIST 1, 31, 61, 91, 101: fluid coupling
2, 32, 62, 92: joint member (first member)
3, 33, 63, 93: joint member (second member)
4, 34, 64, 65: gasket
5, 35, 66: male screw member (screw means)
6, 36, 67: female screw member (screw means)
7, 37, 68: gasket housing recess
21, 51, 81: thick portion
22, 52, 82: thin portion
23, 52, 83: wide portion
24, 54, 84: narrow portion
25: lip (annular protrusion)
94: bolt (screw means)
96: flange
39: shaft insertion hole (bolt insertion hole)
100: screw hole (bolt insertion hole)
102: second member
103a: female screw portion (screw means)
103: connection portion

DESCRIPTION OF EMBODIMENTS

Embodiments of the present invention will be described below with reference to the drawings.

Figure 2:
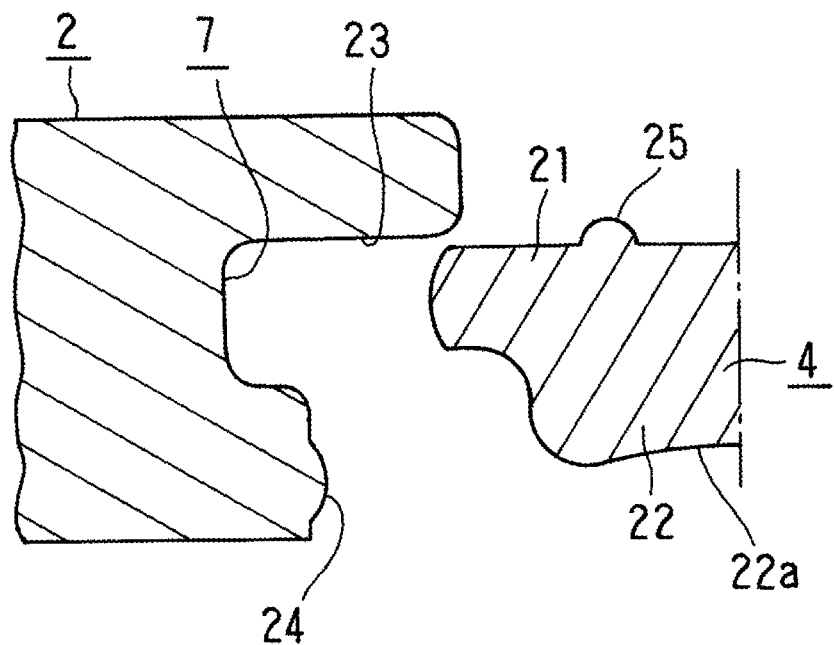
FIG. 2 is an enlarged vertical cross-sectional view of a major part of the gasket for the fluid coupling and the fluid coupling of the first embodiment, showing the shape thereof before fastening is performed.
Figure 3:
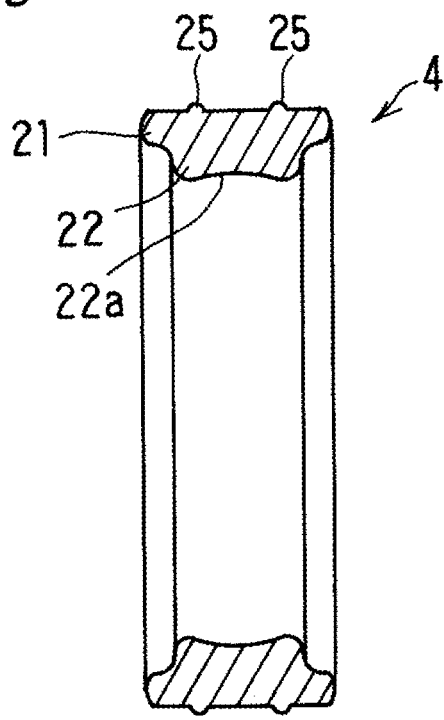
FIG. 3 is an enlarged vertical cross-sectional view of the gasket for the fluid coupling of the first embodiment.

FIG. 1 to FIG. 3 show a fluid coupling in accordance with a first embodiment of the present invention. FIG. 1 shows a state of the fluid coupling after being fastened. FIG. 2 and FIG. 3 show the shape of the fluid coupling before being fastened.

As shown in FIG. 1, a fluid coupling 1 is a pipe joint and includes: a first and second tubular joint members 2 and 3 having fluid passages being in communication with each other; an annular gasket 4 interposed between the joint members 2 and 3; a male screw member 5 having a substantially cylindrical shape and being fitted to the first joint member 2; and a female screw member 6 having a substantially cylindrical shape and being fitted to the second joint member 3.

The joint members 2 and 3, the gasket 4, the male screw member 5, and the female screw member 6 are all made of synthetic resin.

The first joint member 2 consists of: a cylindrical sleeve body 1 having an inner periphery that defines a fluid passage; and a flange 12 provided integrally with a butt end portion of the sleeve body 11. The second joint member 3 consists of: a cylindrical sleeve body 13 having an inner periphery that defines a fluid passage; and a flange 14 provided integrally with a butt end portion of the sleeve body 13. The shape of the first joint member 2 is identical to that of the second joint member 3.

Sealing performance of the gasket 4 is obtained by a face seal provided between the butt end faces of the first and second joint members 2 and 3. The joint members 2 and 3 are formed so as to be symmetrical to each other with respect to the butt face. The gasket 4 is also formed so as to be symmetrical with respect, to a center plane thereof. The inner diameter of the gasket 4 is equal to the inner diameter of each of the joint members 2 and 3.

At the butt end faces of the joint members 2 and 3, an annular recess 7 for housing the gasket 4 is formed. The butt end portions of the joint members 2 and 3 are butted against each other on both of the radially inside and the radially outside of the recess 7. The annular recess 7 is shaped so as not to be open to either of the radially inside or the radially outside. The annular recess 7 may be shaped so as to be open to the radially inside.

The male screw member 5 includes: a cylindrical body 15, a cylindrical cover portion 16 protruding from a right end face (butt end face) of the body 15 to the right (in the axial direction) and covering an outer peripheral surface of a butt portion of the joint members 2 and 3; a male screw portion 17 provided on an outer periphery of a right end portion (butt end portion) of the body 15; and a hexagonal engagement portion 18 provided on an outer periphery of a left end portion (non-butt end portion) of the body 15. The male screw member 5 is fitted to the first joint member 2 from the left, and a right surface of the body 15 is brought into contact with a left surface of the flange 12 of the first joint member 2 from the left.

The female screw member 6, referred to as a cap nut, is fitted to the second joint member 3 from the right. The female screw member 6 includes: a body 19; and an inward flange 20 provided on a right end portion of the body 19. On an inner periphery of the left end portion of the body 19, a female screw portion 19a is provided, which is screwed to the male screw portion 17 of the male screw member 5. The inward flange 20 is fitted around the sleeve body 13 of the second joint member 3, and is brought into contact with a right surface of the flange 14 of the second joint member 3 from the right.

The cover portion 16 of the male screw member 5 has: an inner diameter that is slightly greater than an outer diameter of the flanges 12 and 14 of the first and second joint members 2 and 3; and an outer diameter that is slightly smaller than an inner diameter of the female screw member 6.

Between the flange 14 of the second joint member 3 and the inward flange 20 of the female screw member 6, a thrust washer 8 as co-rotation prevention means is interposed.

The thrust washer 8 may be made of synthetic resin, and be manufactured by forming a Ni(nickel)-P(phosphorus)+PTFE(polytetrafluoroethylene) composite coating on a stainless steel surface and applying a heat treatment hereto.

The gasket 4 is T-shaped in cross section, and includes: a thick portion 21 having a substantially rectangular shape in cross section, positioned radially outside, and for providing a first face seal; and a thin portion 22 having a substantially rectangular shape in cross section, positioned radially inside, and for providing a second face seal.

To be in conformity with the shape of the gasket 4, the gasket housing recess 7 includes: a wide portion 23 having a substantially rectangular shape in cross section and positioned radially outside; and a narrow portion 24 having a substantially rectangular shape in cross section and positioned radially inside.

The thick portion 21 of the gasket 4 is in intimate contact with an inner surface of the wide portion 23 of the gasket housing recess 7 over a substantially entire surface thereof. The thin portion 22 of the gasket 4 is in intimate contact with an inner surface of the narrow portion 24 of the gasket housing recess 7 over a substantially entire surface thereof.

As shown in FIG. 2 and FIG. 3, each corner portion formed at the thick portion 21 of the gasket 4, the thin portion 22 of the gasket 4, and a boundary between the thick and thin portions 21 and 22 is rounded. To be in conformity with the rounded shape, each corner portion formed at the wide portion 23 of the gasket housing recess 7, the narrow portion 24 of the gasket housing recess 7, and a boundary between the wide and narrow portions 23 and 24 is also rounded.

On a radially inside surface of the thin portion 22 of the gasket 4, a curved portion 22a that has an inverted curve toward the radially outside is formed. This curved portion 22a prevents the radially inside surface of the thin portion 22 from protruding toward the radially inside (having an inverted curve toward the radially inside) even when the temperature is high.

On a radially outside surface of the thick portion 21 of the gasket 4, two lips (annular protrusions each having the shape of a semicircle in cross section) 25 that protrude toward the radially outside are formed symmetrically. These lips 25 prevent the gasket 4 from dropping from the gasket housing recess 7 at a time when the gasket 4 is fitted to the fluid coupling 1. The height of the lip 25 is, for example, 0.1 to 0.2 mm.

In the fluid coupling 1 of the first embodiment, the thick portion 21 positioned on the radially outside of the gasket 4 is designed in consideration of a case where pressurization of the fluid is performed, and the thin portion 22 positioned on the radially inside of the gasket 4 is designed in consideration of a case where depressurization of the fluid is performed. In addition, a squeeze (or compressibility) of the first face seal provided by the thick portion 21 and a squeeze (or compressibility) of the second face seal provided by the thin portion 22 are separately set at favorable values (normally at different values). Accordingly, both of the thick portion 21 and the thin portion 22 of the gasket 4 provide respective face seals, whereby an excellent sealing performance is obtained.

Figure 4:
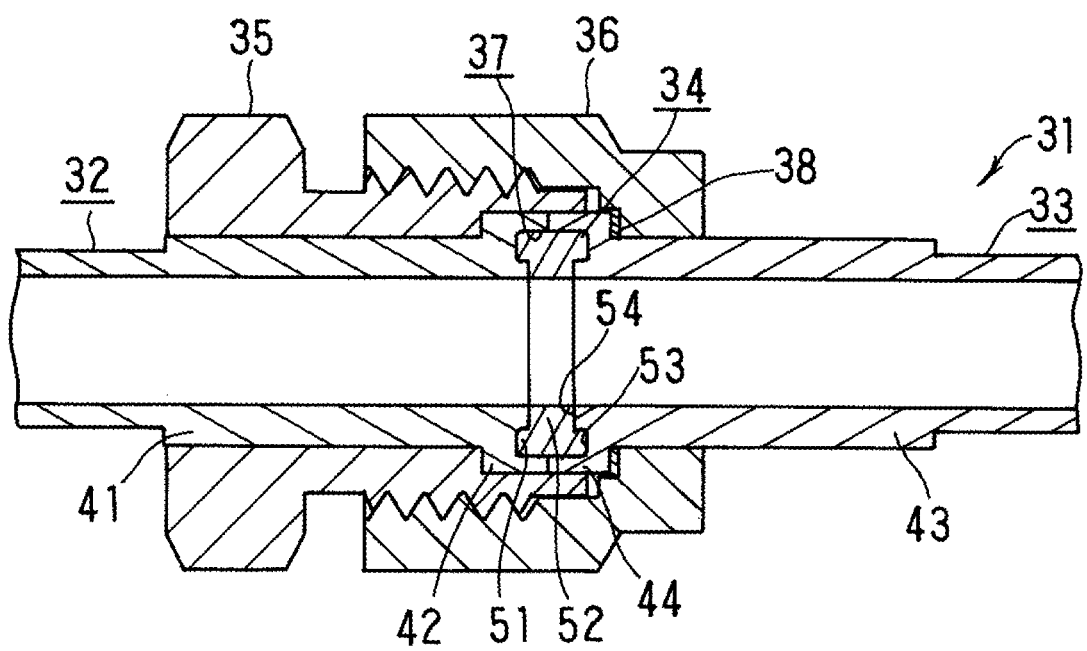
FIG. 4 is a vertical cross-sectional view of a gasket for a fluid coupling and the fluid coupling as an entire configuration of a second embodiment in accordance with the present invention.

FIG. 4 shows a fluid coupling in accordance with a second embodiment of the present invention. FIG. 4 shows a state of the fluid coupling after being fastened.

As shown in FIG. 4, a fluid coupling 31 is a pipe joint and includes: a first and second tubular joint members 32 and 33 having fluid passages being in communication with each other; an annular gasket 34 interposed between the joint members 32 and 33; a male screw member 35 having a substantially cylindrical shape and being fitted to the first joint member 32; and a female screw member 36 having a substantially cylindrical shape and being fitted to the second joint member 33.

The joint members 32 and 33, the gasket 34, the male screw member 35, and the female screw member 36 are all made of metal.

The first joint member 32 consists of: a cylindrical sleeve body 41 having an inner periphery that defines a fluid passage; and a flange 42 provided integrally with a butt end portion of the sleeve body 41. The second joint member 33 consists of: a cylindrical sleeve body 43 having an inner periphery that defines a fluid passage; and a flange 44 provided integrally with a butt end portion of the sleeve body 43. The shape of the first joint member 32 is identical to that of the second joint member 33.

Sealing performance of the gasket 34 is obtained by a face seal provided between the butt end faces of the first and second joint members 32 and 33. The joint members 32 and 33 are formed so as to be symmetrical to each other with respect to the butt face. The gasket 34 is also formed so as to be symmetrical with respect to a center plane thereof. The inner diameter of the gasket 34 is equal to the inner diameter of each of the joint members 32 and 33.

At the butt end faces of the joint members 32 and 33, an annular recess 37 for housing the gasket 34 is formed. The butt end portions of the joint members 32 and 33 are butted against each other on the radially outside of the recess 37. The annular recess 37 is shaped so as to be open to the radially inside.

Between the flange 44 of the second joint member 33 and an inward flange of the female screw member 36, a thrust washer 38 as co-rotation prevention means is interposed.

The shapes of the male screw member 35, the female screw member 36, and the thrust washer 38 are identical to those in the first embodiment. Therefore, detailed description thereof is omitted.

The gasket 34 is T-shaped in cross section, and includes: a thick portion 51 having a substantially rectangular shape in cross section, positioned radially outside, and for providing a first face seal; and a thin portion 52 having a substantially rectangular shape in cross section, positioned radially inside, and for providing a second face seal.

To be in conformity with the shape of the gasket 34, the gasket housing recess 37 includes: a wide portion 53 having a substantially rectangular shape in cross section and positioned radially outside; and narrow portion 54 having a substantially rectangular shape in cross section and positioned radially inside.

The thick portion 51 of the gasket 34 is in intimate contact with an inner surface of the wide portion 53 of the gasket housing recess 37 over a substantially entire surface thereof. The thin portion 52 of the gasket 34 is in intimate contact with an inner surface of the narrow portion 54 of the gasket housing recess 37 over a substantially entire surface thereof.

In contrast to the case of the first embodiment, responding to the configuration that the joint members 32 and 33 and the gasket 34 are made of metal, each corner portion formed at the thick portion 51 of the gasket 34, the thin portion 52 of the gasket 34, and a boundary between the thick and thin portions 51 and 52 is not rounded. Conforming to this, each corner portion formed at the wide portion 53 of the gasket housing recess 37, the narrow portion 54 of the gasket housing recess 37, and a boundary between the wide and narrow portions 53 and 54 is also not rounded. In addition, a curved portion on a radially inside surface of the thin portion 52 of the gasket 34, and lips on an outer peripheral surface of the thick portion 51 of the gasket 34 are omitted.

In the fluid coupling 31 of the second embodiment, the thick portion 51 positioned on the radially outside of the gasket 34 is designed in consideration of a case where pressurization of the fluid is performed, and the thin portion 52 positioned on the radially inside of the gasket 34 is designed in consideration of a case where depressurization of the fluid is performed. In addition, a squeeze (or compressibility) of the first face seal provided by the thick portion 51 and a squeeze for compressibility) of the second face seal provided by the thin portion 52 are separately set at favorable values (normally at different values). Accordingly, both of the thick portion 51 and the thin portion 52 of the gasket 34 provide respective face seals, whereby an excellent sealing performance is obtained.

Although not shown, the butt end faces of the joint members 32 and 33 in the second embodiment may be provided with an annular protrusion for pressing the gasket 34.

Figure 5:
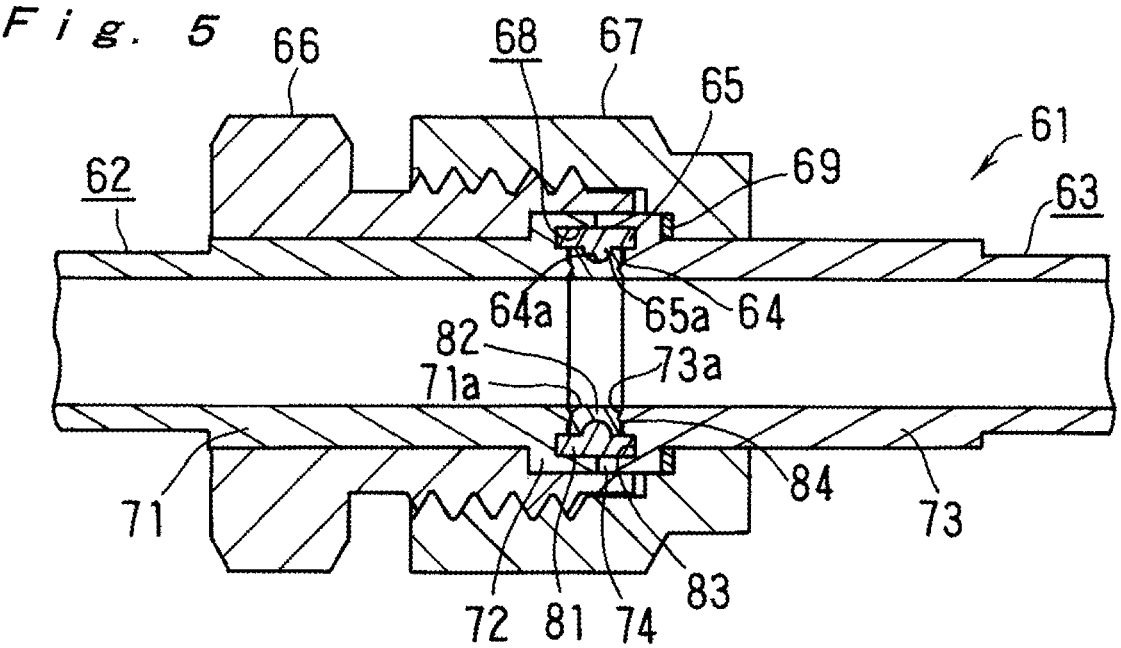
FIG. 5 is a vertical cross-sectional view of a gasket for a fluid coupling and the fluid coupling as an entire configuration of a third embodiment in accordance with the present invention.

FIG. 5 shows a fluid coupling in accordance with a third embodiment of the present invention. FIG. 5 shows a state of the fluid coupling after being fastened.

As shown in FIG. 5, a fluid coupling 61 is a pipe joint and includes: a first and second tubular joint members 62 and 63 having fluid passages being in communication with each other; a first and second annular gaskets 64 and 65 interposed between the joint members 62 and 63; a male screw member 66 having a substantially cylindrical shape and being fitted to the first joint member 62; and a female screw member 67 having a substantially cylindrical shape and being fitted to the second joint member 63.

The joint members 62 and 63, the first gasket 64, the male screw member 66, and the female screw member 67 are all made of metal. The second gasket 65 is made of synthetic resin.

The first joint member 62 consists of: a cylindrical sleeve body 71 having an inner periphery that defines a fluid passage; and a flange 72 provided integrally with a butt end portion of the sleeve body 71. The second joint member 63 consists of: a cylindrical sleeve body 73 having an inner periphery that defines a fluid passage; and a flange 74 provided integrally with a butt end portion of the sleeve body 73. The shape of the first joint member 62 is identical to that of the second joint member 63.

The first and second gaskets 64 and 65 provide a face seal between butt end faces of the first and second joint members 62 and 63, whereby the sealing performance is obtained. The joint members 62 and 63 are formed so as to be symmetrical with each other with respect to the butt end face, and the first and second gaskets 64 and 65 are also formed so as to be symmetrical with each other with respect to a center plane thereof. The inner diameter of the first gasket 64 is equal to the inner diameter of each of the joint members 62 and 63.

At the butt end faces of the joint members 62 and 63, an annular recess 68 for housing the first and second gaskets 64 and 65 is formed. The butt end portions of the joint members 62 and 63 are butted against each other on the radially outside of the recess 68. The annular recess 68 is shaped so as to be open to the radially inside.

Between the flange 74 of the second joint member 63 and an inward flange of the female screw member 67, a thrust washer 69 as co-rotation prevention means is interposed.

The shapes of the male screw member 66, the female screw member 67, and the thrust washer 69 are identical to those in the first embodiment. Therefore, detailed description thereof is omitted.

The first and second gaskets 64 and 65 are T-shaped in cross section when combined, and includes: a thick portion 81 having a substantially rectangular shape in cross section, positioned radially outside, and for providing a first face seal; and a thin portion 82 having a substantially rectangular shape in cross section, positioned radially inside, and for providing a second face seal.

The first gasket 64 constitutes the thin portion 82. The first gasket 64 is provided on an outer peripheral surface thereof with an annular recess 64a having the shape of a semicircle in cross section. The second gasket 65 constitutes the thick portion 81. The second gasket 65 is provided on an inner peripheral surface thereof with an annular protrusion 65a. The recess 64a is fitted to the protrusion 65a, whereby the first and second gaskets 64 and 65, as a whole, constitute an annular gasket that is T-shaped in cross section.

To be in conformity with the shape of the first and second gaskets 64 and 65, the gasket housing recess 68 includes: a wide portion 83 having a substantially rectangular shape in cross section and positioned radially outside; and a narrow portion 84 having a substantially rectangular shape in cross section and positioned radially inside.

The second gasket 65 constituting the thick portion 81 is in intimate contact with an inner surface of the wide portion 83 of the gasket housing recess 68 over a substantially entire surface of an exposed surface of the second gasket 65. The first gasket 64 constituting the thin portion 82 is in intimate contact with an inner surface of the narrow portion 84 of the gasket housing recess 68 over a substantially entire surface of an exposed surface of the first gasket 64.

The butt end face of the sleeve body 71 of the joint member 62 is provided with an annular protrusion 71a for pressing the first gasket 64. The butt end face of the sleeve body 73 of the joint member 63 is provided with an annular protrusion 73a for pressing the first gasket 64.

In the fluid coupling 61 of the third embodiment, the gasket 65 positioned on the radially outside and forming the thick portion 81 is designed in consideration of a case where pressurization of the fluid is performed, and the gasket 64 positioned on the radially inside and forming the thin portion 82 is designed in consideration of a case where depressurization of the fluid is performed. In addition, a squeeze (or compressibility) of the first face seal provided by the thick portion 81 and a squeeze (or compressibility) of the second face seal provided by the thin portion 82 are separately set at favorable values (normally at different values). The gasket 64 made of metal compensates for short comings of the gasket 65 made of synthetic resin, which are that change in shape over time of the gasket made of synthetic resin is greater than that made of metal. The gasket 65 made of synthetic resin compensates for shortcomings of the gasket 64 made of metal, which are regarding a fluid that causes metal to corrode, such as ammonium hydrogen fluoride. Accordingly, both of the gasket 64 made of metal and the gasket 65 made of synthetic resin provide respective face seals, whereby an excellent sealing performance is obtained.

Figure 6:
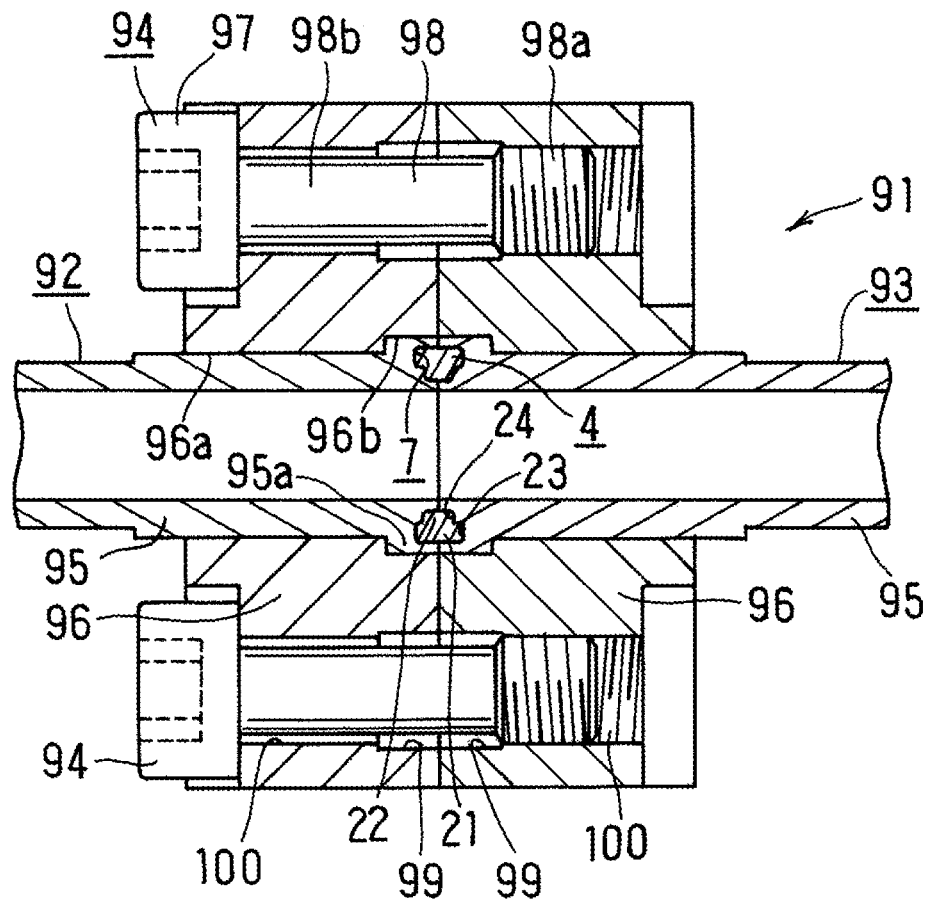
FIG. 6 is a vertical cross-sectional view of a gasket for a fluid coupling and the fluid coupling as an entire configuration of a fourth embodiment in accordance with the present invention.

FIG. 6 shows a fluid coupling in accordance with a fourth embodiment of the present invention. A fluid coupling 91 includes: a first and second joint members 92 and 93 having fluid passages being in communication with each other; an annular gasket 4 interposed between the joint members 92 and 93; and a plurality of (one or a plurality of) bolts 94 for coupling the joint members 92 and 93.

The gasket 4 used herein is identical to that in the first embodiment.

The joint members 92 and 93 each consist of: a cylindrical sleeve 95 having an inner periphery defining a fluid passage; a flange 96 formed separately from the sleeve 95. The sleeves 95 to be butted against each other each have a shape identical to each other. The flanges 96 to be butted against each other each have a shape identical to each other.

Each of the bolts 94 consists of: a head portion 97 provided with a hexagonal hole; and a shaft portion 98. The shaft port on 98 has: a distal end portion provided with a male screw 98a; and a remaining portion 98b in which a male screw is not formed.

The sleeves 95 of the joint members 92 and 93 are butted against each other. On an outer periphery of each of the butt end portions of the sleeves 95, a flange portion 95a is provided. On the butt end face, a recess 7 for housing the gasket 4 is formed.

The gasket 4 used herein is identical to that in the first embodiment. Conforming to this, the recess 7 for housing the gasket 4 is identical to that in the first embodiment.

Specifically stated, the gasket 4 is T-shaped in cross section and includes: a thick portion 21 having a substantially rectangular shape in cross section, positioned radially outside, and for providing a first face seal; and a thin portion 22 having a substantially rectangular shape in cross section, positioned radially inside, and for providing a second face seal. To be in conformity with the shape of the gasket 4, the gasket housing recess 7 includes: a wide portion 23 having a substantially rectangular shape in cross section and positioned radially outside; and a narrow portion 24 having a substantially rectangular shape in cross section and positioned radially inside. The thick portion 21 of the gasket 4 is in intimate contact with an inner surface of the wide portion 23 of the gasket housing recess 7 over a substantially entire surface. The thin portion 22 of the gasket 4 is in intimate contact with an inner surface of the narrow portion 24 of the gasket housing recess 7 over a substantially entire surface.

Each of the flanges 96 of the joint members 92 and 93 has a through hole 96a to be inserted into the sleeve 95. The flanges 96 are butted against each other with the flanges 96 being fitted to the corresponding sleeves 95. On an inner periphery of the butt end portion of the flange 96, a recess 96b is formed, to which the flange portion 95a of the sleeve 95 is fitted.

The flange 96 is provided, as a hole to be inserted by the bolt 94, with: a shaft insertion hole 99 positioned on the butt end face side; and a screw hole 100 that is contiguous to the shaft insertion hole 99 and extends to a non-butt end face.

A pair of flanges 96 are arranged in an opposing manner such that the shaft insertion holes 99 are positioned on the butt end face side and the screw holes 100 are positioned on the non-butt end face side.

With the fluid coupling 91 in accordance with the above-described fourth embodiment, because the seal portion used herein is identical to that of the fluid coupling 1 of the first embodiment, an excellent sealing performance is obtained as in the first embodiment.

In the fourth embodiment, each of the joint members 92 and 93 consists of the sleeve 95 and the flange 96. However, the configuration of the joint member is not limited thereto. Each joint member may, for example, consist of one member, or consist of three or more members. The shape of each member also may be changed in various manners.

Although a pipe joint is used in each of the first to the fourth embodiments, sealing structures using the above-described gaskets 4, 34, 64, and 65 are applicable to coupling portions of various types of devices, as fluid couplings other than the pipe joint. As one example thereof, FIG. 7 shows a fluid coupling in accordance with the fifth embodiment.

Figure 7:
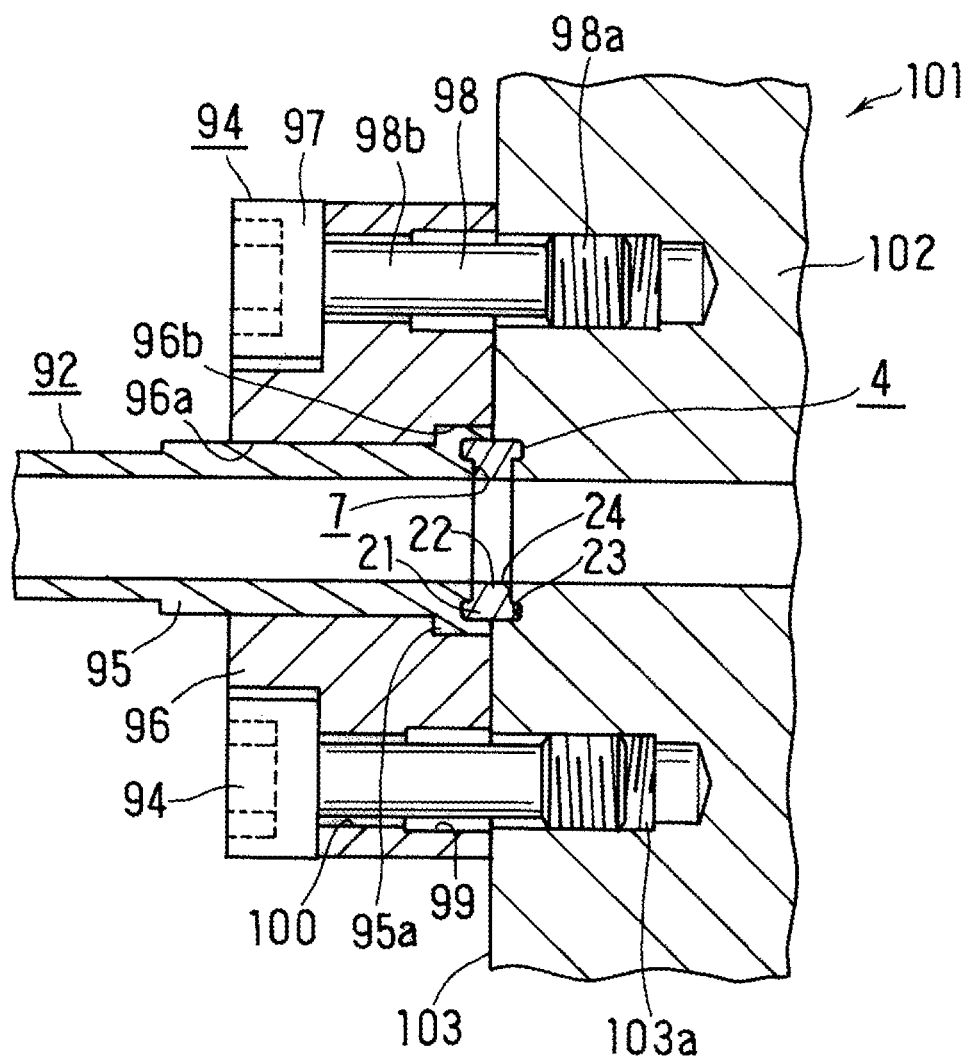
FIG. 7 is a vertical cross-sectional view of a gasket for a fluid coupling and the fluid coupling as an entire configuration of a fifth embodiment in accordance with the present invention.

In FIG. 7, a fluid coupling 101 includes: a first and second members 92 and 102 having fluid passages being in communication with each other; an annular gasket 4 interposed between the members 92 and 102; and a plurality of (one or a plurality of) bolts 94 for coupling the members 92 and 102.

The first member 92 is a tubular joint member identical to one member 92 of the fourth embodiment. The second member 102 is a part of an aluminum chamber used in the gas supply section of the semiconductor manufacturing apparatus.

Regarding the first member 92, the same reference sign as that in the fourth embodiment is used, and description thereof is omitted. The second member 102 is provided with a connection portion 103 having a female screw portion 103a.

The gasket 4 and the recess 7 for housing the gasket 4 are substantially the same as those in the fourth embodiment.

Specifically stated, the gasket 4 is T-shaped in cross section and includes: a thick portion 21 having a substantially rectangular shape in cross section, positioned radially outside, and for providing a first face seal; and a thin portion 22 having a substantially rectangular shape in cross section, positioned radially inside, and for providing a second face seal. To be in conformity with the shape of the gasket 4, the gasket housing recess 7 includes: a wide portion 23 having a substantially rectangular shape in cross section and positioned radially outside; and a narrow portion 24 having a substantially rectangular shape in cross section and positioned radially inside. The thick portion 21 of the gasket 4 is in intimate contact with an inner surface of the wide portion 23 of the gasket housing recess 7 over a substantially entire surface. The thin portion 22 of the gasket 4 is in intimate contact with an inner surface of the narrow portion 24 of the gasket housing recess 7 over a substantially entire surface.

In the embodiment shown in FIG. 7, the recess 7 is shaped so as to be open to the radially inside.

With the fluid coupling 101 in accordance with the above-described fifth embodiment, because the seal portion used herein is identical to that of the fluid coupling 1 of the first embodiment, an excellent sealing performance is obtained as in the first embodiment.

INDUSTRIAL APPLICABILITY

With the present invention, in the gasket for the fluid coupling and in the fluid coupling, improvement of the sealing performance of which has always been a problem to be solved, its sealing performance is improved. Therefore, the present invention contributes to improvement of the performance of the gasket for the fluid coupling, and of the fluid coupling.

The invention claimed is:

1. A gasket for a fluid coupling, configured to provide a face seal by being fitted into an annular recess provided in the fluid coupling, wherein
the gasket has a T-shaped cross section and includes:
a thick portion positioned radially outside of the gasket, the thick portion providing a first face seal; and
a thin portion positioned radially inside of the gasket, the thin portion having a curved portion that has an inverted curve, the thin portion including the inverted curve providing a second face seal, wherein
one of the thick portion and the thin portion is made of metal, and
the other of the thick portion and the thin portion is made of synthetic resin.

2. The gasket for the fluid coupling according to claim 1, wherein
at least one anti-drop protrusion is provided on an outer peripheral surface of the gasket.

3. A fluid coupling comprising:
a first member having a first fluid passage;
a second member having a second fluid passage and connected to the first member in a fluid-tight manner;
a gasket interposed between butt portions of the first and second members; and
screw means for connecting the first and second members, in which each of the first and second members is provided on a butt end face thereof with an annular gasket housing recess for housing the gasket when the first and second members are butted against each other, wherein
the gasket housing recess includes a wide portion for housing the thick portion of the gasket and a narrow portion for housing the thin portion of the gasket, and
the gasket is the gasket for the fluid coupling according to claim 1.

4. The fluid coupling according to claim 3, wherein
both of the first member and the second member are tubular joint members.

5. The fluid coupling according to claim 3, wherein
the first member is a tubular joint member provided with a flange having a bolt insertion hole, and
the second member is a member provided with a connection portion having a female screw portion.

6. A gasket for a fluid coupling, configured to provide a face seal by being fitted into an annular recess provided in the fluid coupling, wherein the gasket comprises:
a thick portion providing a first face seal; and
a thin portion providing a second face seal, wherein
a compressibility of the first face seal and a compressibility of the second face seal is set at different values from each other,
each corner portion formed at the thick portion and thin portion is rounded, and
at least one anti-drop protrusion is provided on an outer peripheral surface of the gasket, and the at least one anti-drop protrusion is in intimate contact with the annular recess provided in the fluid coupling.

7. The gasket for the fluid coupling according to claim 6, wherein
one of the thick portion and the thin portion is made of metal, and the other of the thick portion and the thin portion is made of synthetic resin.

8. A fluid coupling comprising:
a first member having a first fluid passage;
a second member having a second fluid passage and connected to the first member in a fluid-tight manner;
a gasket interposed between butt portions of the first and second members; and
screw means for connecting the first and second members, in which each of the first and second members is provided on a butt end face thereof with an annular gasket housing recess for housing the gasket when the first and second members are butted against each other, wherein
the gasket housing recess includes a wide portion for housing the thick portion of the gasket and a narrow portion for housing the thin portion of the gasket, wherein
the butt end portions of the first member and the second member are butted against each other on a radially outside of the gasket housing recess, and
wherein the gasket is the gasket for the fluid coupling according to claim 6.

9. The fluid coupling according to claim 8, wherein both of the first member and the second member are tubular joint members.

10. The fluid coupling according to claim 8, wherein the first member is a tubular joint member provided with a flange having a bolt insertion hole, and the second member is a member provided with a connection portion having a female screw portion.

11. The fluid coupling according to claim 8, wherein a boundary between the thick and thin portions is rounded, and to be in conformity with the rounded shape, each corner portion formed at the wide portion of the gasket housing recess, the narrow portion of the gasket housing recess, and a boundary between the wide and narrow portions is rounded.

\* \* \* \* \*